United States Patent
Luo et al.

(10) Patent No.: US 8,553,419 B2
(45) Date of Patent: Oct. 8, 2013

(54) CARD TRAY EJECTION MECHANISM AND ELECTRONIC DEVICE USING THE SAME

(75) Inventors: Wen-Dong Luo, Shenzhen (CN); Wen-Wu Wang, Shenzhen (CN); Wen-Ping Wang, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 263 days.

(21) Appl. No.: 13/163,756

(22) Filed: Jun. 20, 2011

(65) Prior Publication Data

US 2012/0162925 A1 Jun. 28, 2012

(30) Foreign Application Priority Data

Dec. 28, 2010 (CN) .......................... 2010 1 0609813

(51) Int. Cl.
 *H05K 7/14* (2006.01)
(52) U.S. Cl.
 USPC ............ 361/727; 361/726; 312/120; 312/123
(58) Field of Classification Search
 USPC .............................. 361/679.39, 727, 737, 754
 See application file for complete search history.

(56) References Cited

U.S. PATENT DOCUMENTS

| | | | | |
|---|---|---|---|---|
| 5,448,432 A | * | 9/1995 | Saga et al. ................ | 360/96.51 |
| 5,769,646 A | * | 6/1998 | Cavello et al. ............. | 439/136 |
| 7,184,274 B2 | * | 2/2007 | Wu et al. ...................... | 361/752 |
| 2008/0165508 A1 | * | 7/2008 | Wang et al. .................. | 361/728 |

\* cited by examiner

*Primary Examiner* — Jayprakash N Gandhi
*Assistant Examiner* — Ahmad D Barnes
(74) *Attorney, Agent, or Firm* — Altis & Wispro Law Group, Inc.

(57) ABSTRACT

A card tray ejection mechanism for an electronic device, which includes a first elongated member rotatably mounted to the base, a second elongated member, and a driving member. The first elongated member includes a first end portion resisting against a side of the tray, a second end portion opposite to the first end portion and a pivoting rod located between the first and second end portions. The second elongated member is rotatably connected to the second end portion. The driving member drives the second elongated member to move longitudinally. When the second elongated member is driven to move longitudinally by the driving member, the first elongated member is driven to rotate around the pivoting rod by the second elongated member, and the card tray is ejected. An electronic device using the card tray ejection mechanism is also provided.

16 Claims, 5 Drawing Sheets

CARD TRAY EJECTION MECHANISM AND ELECTRONIC DEVICE USING THE SAME

BACKGROUND

1. Technical Field

The present disclosure relates to electronic devices and, particularly, to an electronic device having a card tray ejection mechanism.

2. Description of Related Art

To take out a mobile phone smart card, such as a SIM card, a cover and a battery must first be removed, or at least the cover must be removed.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
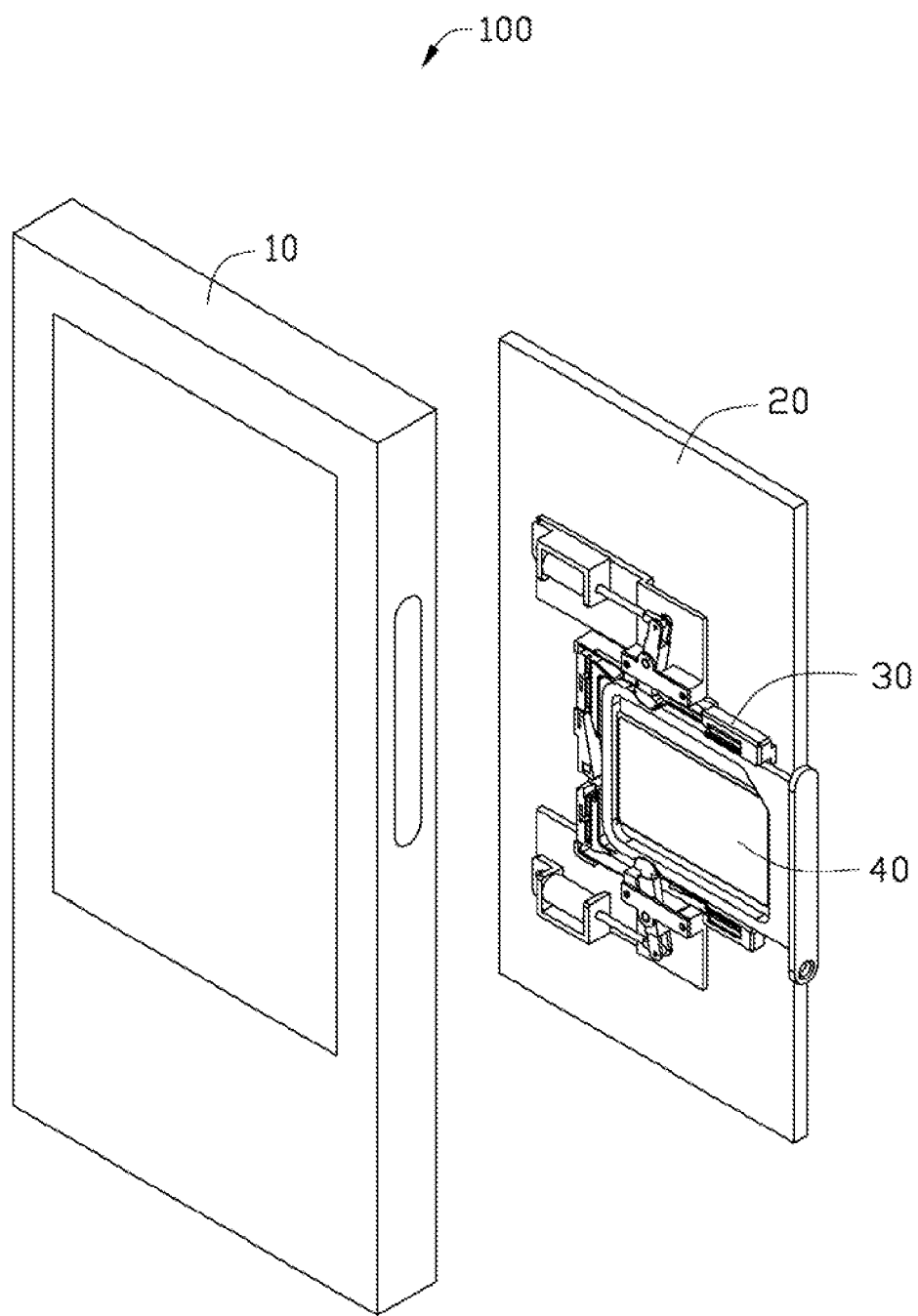
FIG. 1 is a partially perspective view of an electronic device in accordance with an exemplary embodiment; the electronic device includes a card tray ejection mechanism.
Figure 2:
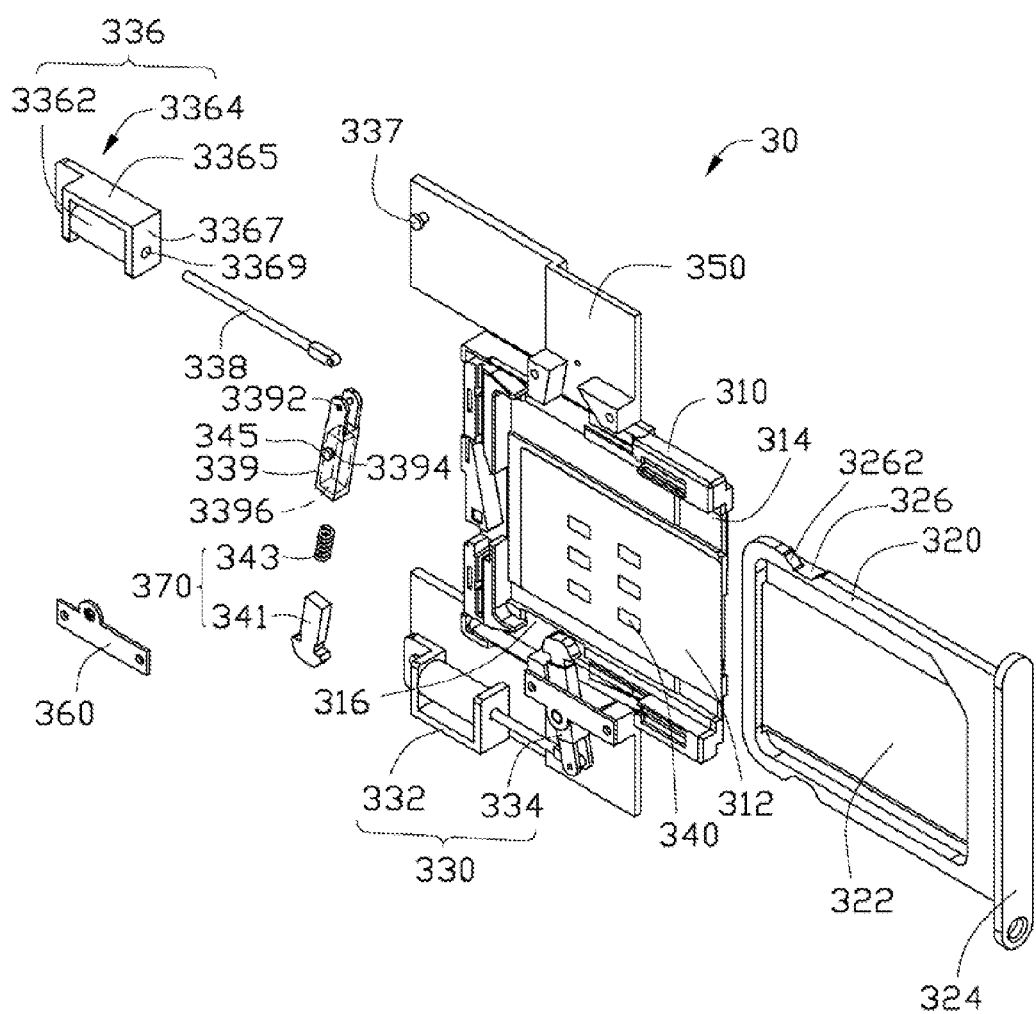
FIG. 2 is a partial disassembled perspective view of the card tray ejection mechanism of FIG. 1.

Referring to FIGS. 1 and 2, an electronic device 100 in accordance with an embodiment is shown. The electronic device 100 includes a housing 10, a circuit board 20 accommodated in the housing 10, and a card tray ejection mechanism 30 electrically connected to and mounted on the circuit board 20. The card tray of the card tray ejection mechanism 30 is used for holding an electronic card 40, such as a SIM card or a SD card, and the mechanism is capable of ejecting the tray carrying the electronic card 40 out of the housing 10. In some embodiments, the electronic device 100 may be a smart mobile phone, and the electronic card 40 may be a SIM card.

Figure 3:
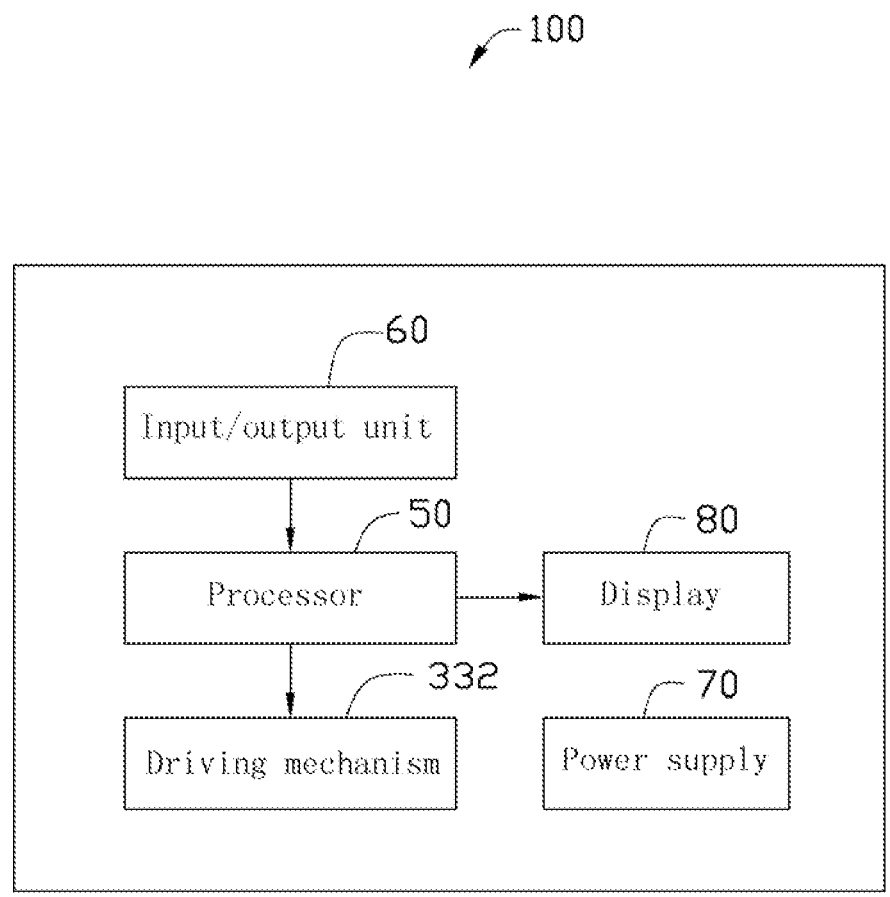
FIG. 3 is a block diagram of the electronic device of FIG. 1.

Also referring to FIG. 3, the electronic device 100 further includes a processor 50, an Input/Output unit 60, a display 80 electrically connected to the processor 50, and a power supply 70 for supplying power to the electronic device 100. The processor 50 is used to control the operations of the electronic device, such as, to eject the card tray holding the electronic card 40 out of the housing 10. The Input/Output unit 60 is adapted to respond to user input, and to output signals.

Again referring to FIG. 2, the card tray ejection mechanism 30 includes a base 310, the tray 320 slidably received in the base 310, two driving mechanisms 330 arranged on either side of the tray 320, and a plurality of sprung pins 340 electrically connected to the circuit board 20. The tray 320 is used to hold the electronic card 40, and may slide in and out of the housing 10. The driving mechanism 330 is configured to eject the tray 320. The electronic card 40 held in the card tray is electrically connected to the circuit board 20 via the sprung pins 340.

The base 310 defines a receiving slot 312 for receiving the tray 320. The receiving slot 312 has an opening 314 on a side. The tray 320 is capable of sliding into and out of the receiving slot 312 via the opening 314. Two sidewalls of the base 310 parallel to the sliding direction of the tray 320 each define a recess 316. The recess 316 communicates with the receiving slot 312.

The sprung pins 340 are arranged at the bottom of the base 310. The sprung pins 340 extend into the receiving slot 312, and are adapted so as to make correct electrical contact with the electronic card 40 held in the tray 320.

The tray 320 is substantially a rectangular frame. The tray 320 defines a receiving space 322 for receiving the electronic card 40. A cover 324 is mounted to an end of the tray 320. The cover 324 covers the opening 314 when the tray 320 occupies the receiving space 312. Two sidewalls of the tray 320 perpendicular to the cover 324 each define a notch 326. The cover 324 is at the front of the tray 320, the notch 326 is arranged towards the rear. The notch 326 is substantially trapezoidal in shape, and includes two engaging surfaces 3262 which slope down towards each other.

The driving mechanisms 330 communicate with the processor 50, and can be controlled by the processor 50 to eject the tray 320 out of the housing 10. Each driving mechanism 330 includes a driving member 332, a transmitting member 334, and a supporting member 350. The supporting member 350 is mounted to the circuit board 20. The driving member 332 is rotatably coupled to the supporting member 350. An end of the transmitting member 334 is coupled to the driving member 332, and the other end of the transmitting member 334 is received in and bears down on the notch 326. The driving member 332 is capable of rotating the transmitting member 334 around a central axis, whereby the tray 320 is moved in relation to the base 310. In the embodiment, the central axis is a pivoting rod 345 arranged on the transmitting member 334 and located between opposite ends of the transmitting member 334.

The driving member 332 includes an electromagnet 336 rotatably coupled to the supporting member 350 and a driving post 338 slidably received in the electromagnet 336. The electromagnet 336 is rotatably coupled to the supporting member 350 via a protruding post 337 fixed to the supporting member 350. The electromagnet 336 includes a conductive winding 3362 and a core 3364 for holding the winding 3362. The core 3364 is substantially U-shaped. The core 3364 includes a body 3365 and two arms 3367 extending perpendicularly from opposite ends of the body 3365. Each arm 3367 defines a through hole 3369. The winding 3362 is sandwiched between the arms 3367, and is coaxial to through hole 3369. The driving post 338 is slidably inserted into the through hole 3369. The distal end of the driving post 338 away from the electromagnet 336 is rotatably coupled to the transmitting member 334. The core 3364 and the driving post 338 are made of a ferromagnetic material.

The transmitting member 334 includes a post 339 and a sprung lever (resisting portion 370) mounted to the post 339. An end of the post 339 defines a first through hole 3392, the other end of the post 339 recesses to define a receiving groove 3396, and the middle of the post 339 defines a second through hole 3394. The post 339 is rotatably coupled to the driving post 338 via a pivot (not labeled) disposed in the first through hole 3392. The post 339 is rotatably coupled to supporting member 350 by the pivoting rod 345 extending through the second through hole 3394. The resisting portion 370 is partially and slidably received in the receiving groove 3396. The resisting portion 370 includes an engaging head 341 and an elastic element 343. By means of spring pressure, the engaging head 341 engages with the notch 326, and is partially receiving in the receiving groove 3396. In the embodiment, the elastic element 343 and the engaging head 341 are received in the receiving space in order. The engaging head 341 may be made of rubber in some embodiments. The elastic element 343 provides an elastic force to drive the engaging head 341 constantly against the notch 326 notwithstanding the variable proximity of the post 339.

The card tray ejection mechanism 30 further includes a limiting block 360 (as shown in FIG. 2). The limiting block 360 is mounted to and parallel to the supporting member 350, and used to limit the movement of the transmitting member 334, such that the transmitting member 334 can nevertheless rotate in a plane parallel to the supporting member 350.

The processer 50 controls the driving member 332. In the embodiment, when the winding 3362 of the driving member 332 is supplied with an alternating current, the driving post 338 is attracted by the electromagnet 336 further into the through hole 3369, and the transmitting member 334 is pulled back so as to eject the tray 320 out of the electronic device 100.

Figure 4:
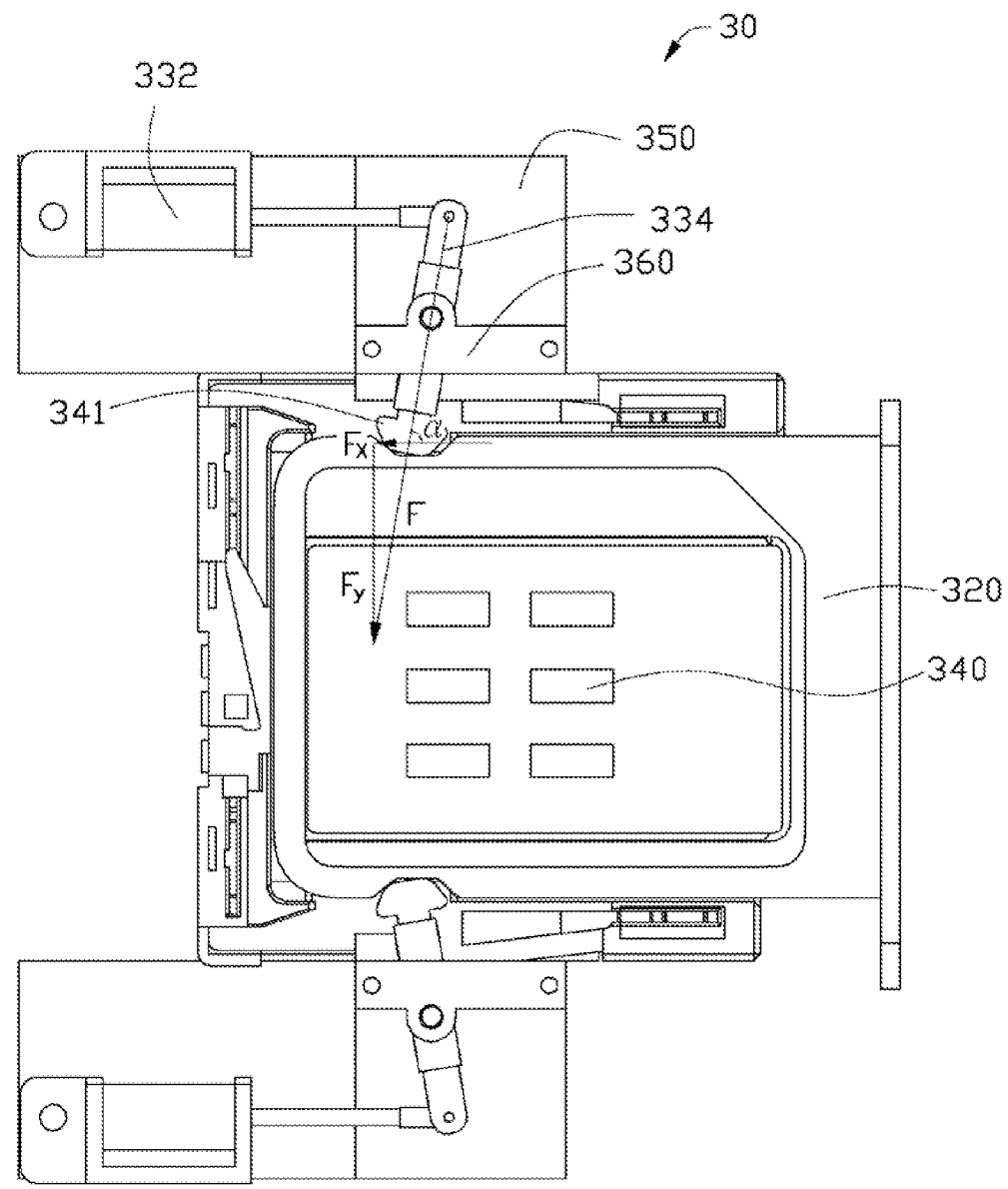
FIG. 4 is a perspective view showing the card tray ejection mechanism assembled and in place inside the electronic device of FIG. 1.

Referring to FIG. 4, the tray 320 is held in the receiving slot 312. The engaging heads 341 of the transmitting members 334 constantly engage with the notch 326, and angle with the inserting direction of the tray 320 in an angle (α) less than 90 degrees, for example, 80 degrees, thus, the engaging heads 341 exert a force (F) to the tray 320. The force (f) is the sum of 2 vectors: the vertical component (Fx) and the horizontal component (Fy), and the vertical component (Fx) is responsible for retaining the tray 320 in the electronic device 100.

Figure 5:
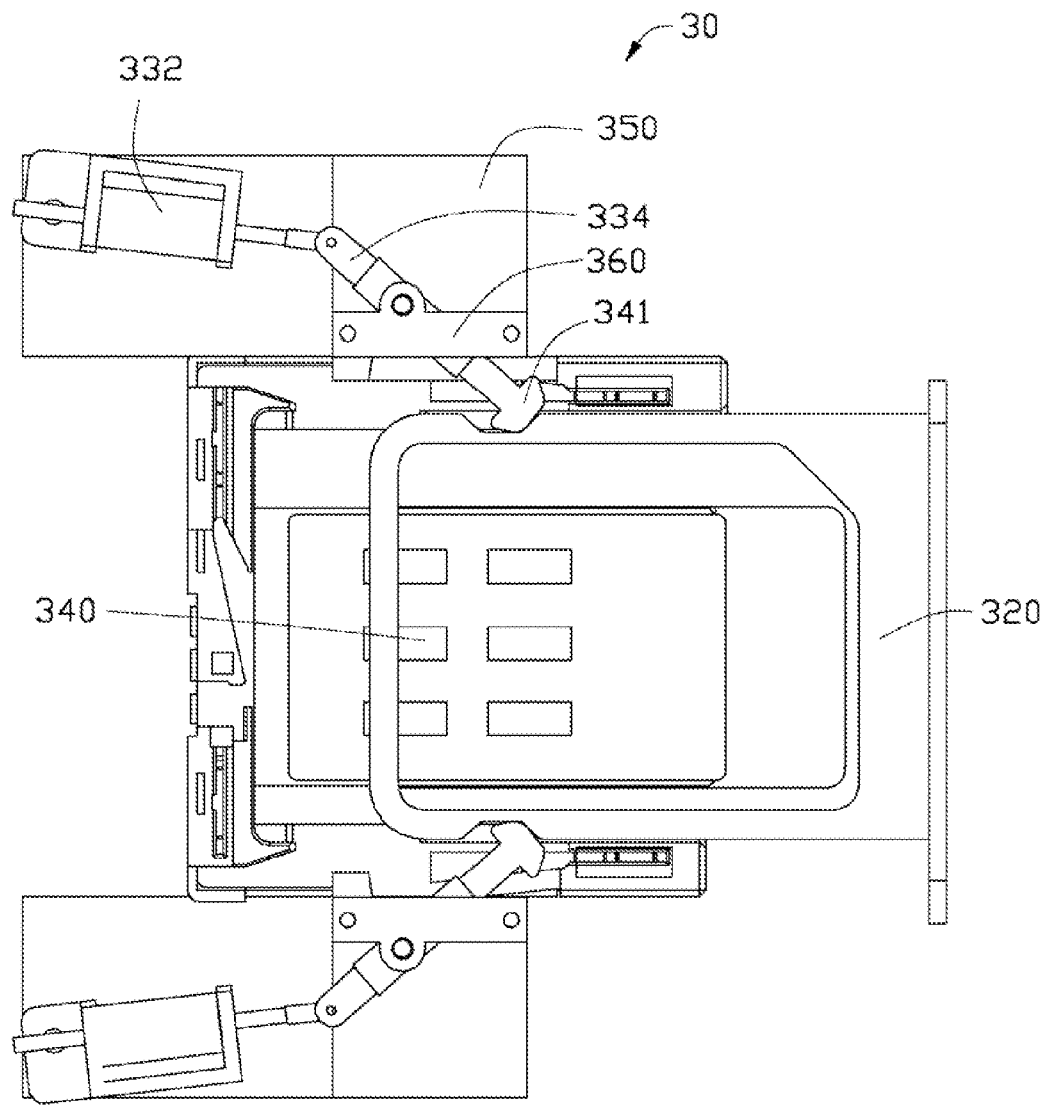
FIG. 5 is a perspective view showing the mechanism ejecting the card tray out of the electronic device of FIG. 1.

Referring to FIG. 5, to eject the tray 320 out of the electronic device 100, the processor 50 controls the power supply 70 supply voltage to the driving member 332, the winding 3362 is powered, and the driving post 338 is attracted further into the through hole 3369. As a result, the transmitting member 334 is driven by the driving post 338 to eject the tray 320 from the electronic device 100.

Referring again to FIG. 4, the ejected tray 320 can be manually pushed back into the electronic device 100 by the user.

By virtue of the card tray ejection mechanism 30, the electronic card 40 held inside the electronic device 100 can be taken out very conveniently.

Even though information and the advantages of the present embodiments have been set forth in the foregoing description, together with details of the structures and functions of the present embodiments, the disclosure is illustrative only; and changes may be made in detail, especially in matters of shape, size, and arrangement of parts within the principles of the present embodiments to the full extent indicated by the broad general meaning of the terms in which the appended claims are expressed.

What is claimed is:

1. A card tray ejection mechanism for ejecting a tray slidably received in a housing of an electronic device, comprising:
   a first elongated member rotatably mounted to the housing, the first elongated member comprising a first end portion resisting against a side of the tray, a second end portion opposite to the first end portion and a pivoting rod located between the first and second end portions and secured to the housing, the first elongated member rotatably mounted to the housing by the pivoting rod;
   a second elongated member rotatably connected to the second end portion; and
   a driving member configured to drive the second elongated member to move longitudinally;
   wherein when the second elongated member is driven to move longitudinally by the driving member, the first elongated member is driven to rotate around the pivoting rod by the second elongated member, and the tray is driven to be ejected out of the housing.

2. The card tray ejection mechanism of claim 1, wherein the driving member comprises an electromagnet, the second elongated member is slidably received in the electromagnet, and the electromagnet is configured to drive the second elongated member to move longitudinally when being conducted.

3. The card tray ejection mechanism of claim 1, further comprising a processor, the processor electrically connected to the driving member, the processor being configured for controlling the driving member to drive the tray being ejected out of the housing.

4. The card tray ejection mechanism of claim 1, wherein the card tray ejection mechanism further comprises a supporting member, and the driving member and the transmitting member are rotatably arranged at the supporting member.

5. An electronic device, comprising:
   a housing; and
   a card tray ejection mechanism for holding an electronic card, the card tray ejection mechanism being accommodated in the housing;
   wherein the card tray ejection mechanism comprises a base, a tray for receiving the electronic card slidably received in the base, at least one driving mechanism resisting against the tray and for driving the tray being ejected out of the housing, the at least one driving mechanism comprises a driving member and a transmitting member rotatably coupled to the driving member, the driving member is configured to drive the transmitting member rotating, and the transmitting member is configured to resist against the tray and to drive the tray being ejected out of the housing when being rotated; wherein the driving member comprises an electromagnet and a driving post slidably received in the electromagnet, and the electromagnet is configured to drive the driving post sliding thereinto when being provided with a current.

6. The electronic device of claim 5, wherein the driving post drives the transmitting member rotating when the electromagnet drives the driving post sliding thereinto.

7. The electronic device of claim 6, wherein the transmitting member comprises a post and a resisting portion, one end of the post is rotatably coupled to the driving post, the resisting portion is slidably received in the other end of the post and resisting against the tray, the post and the resisting portion are driven to rotate when the electromagnet drives the driving post sliding thereinto.

8. The electronic device of claim 7, wherein the post recesses to define a receiving groove for receiving the resisting portion.

9. The electronic device of claim 8, wherein the resisting portion comprises an engaging head partially received in the receiving groove and an elastic element, and the elastic element and the engaging head are received in the receiving groove in order.

10. The electronic device of claim 8, wherein a sidewall of the tray defines a notch corresponding to the engaging head, the engaging head is received in and resists against a wall of the notch to drive the tray being inserted in and ejected out of the housing when the transmitting member is driven to rotate by the driving member.

11. The electronic device of claim 5, further comprising a processor electrically connected to the at least one driving mechanism, the processor being configured for controlling the driving mechanism to drive the tray being ejected out of the housing.

12. The electronic device of claim 5, wherein the card tray ejection mechanism further comprises a supporting member, and the driving member and the transmitting member are rotatably arranged at the supporting member.

13. A card tray ejection mechanism for ejecting a tray slidably received in a housing of an electronic device, comprising:
   a first elongated member rotatably mounted to the housing, the first elongated member comprising a first end portion resisting against a side of the tray, a second end portion opposite to the first end portion and a pivoting rod located between the first and second end portions;
   a second elongated member rotatably connected to the second end portion; and
   a driving member configured to drive the second elongated member to move longitudinally;

wherein when the second elongated member is driven to move longitudinally by the driving member, the first elongated member is driven to rotate around the pivoting rod by the second elongated member, and the tray is driven to be ejected out of the housing; wherein the first elongated member comprises a post and a resisting portion, one end of the post is rotatably coupled to the driving post, the resisting portion is slidably received in the other end of the post and resisting against the tray, the post and the resisting portion are driven to rotate when the second elongated member is driven to move longitudinally by the driving member.

14. The card tray ejection mechanism of claim 13, wherein the post recesses to define a receiving groove for receiving the resisting portion.

15. The card tray ejection mechanism of claim 14, wherein the resisting portion comprises an engaging head partially received in the receiving groove and an elastic element, and the elastic element and the engaging head are received in the receiving groove in order.

16. The card tray ejection mechanism of claim 15, wherein a sidewall of the tray defines a notch corresponding to the engaging head, the engaging head is received in and resists against a wall of the notch to drive the tray being ejected out of the housing when the second elongated member is driven to move longitudinally by the driving member.

* * * * *